Dec. 15, 1970   R. L. SORENSEN ET AL   3,546,741
MOLDING AND LAMINATING MOLDING APPARATUS
Filed May 23, 1968   2 Sheets-Sheet 1
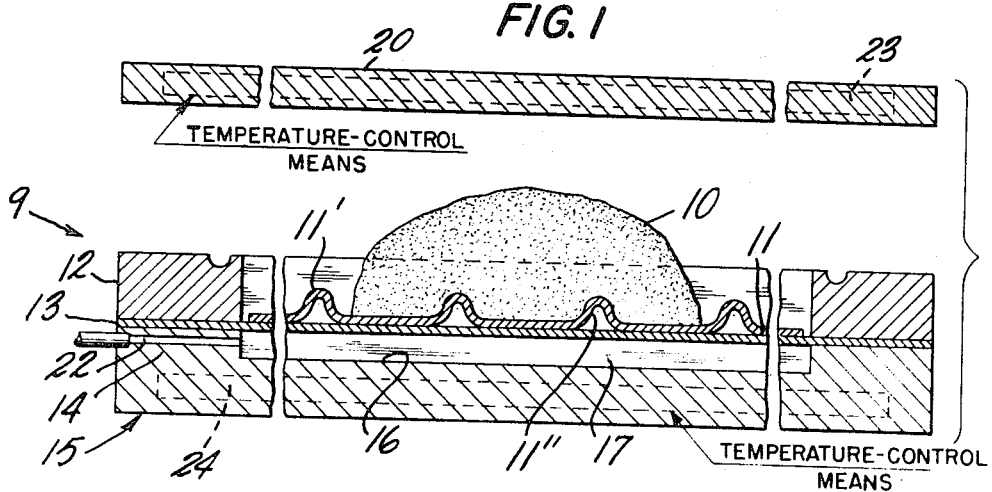
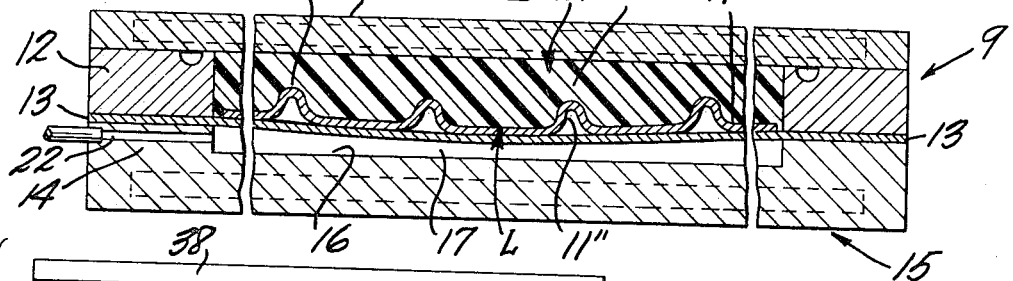
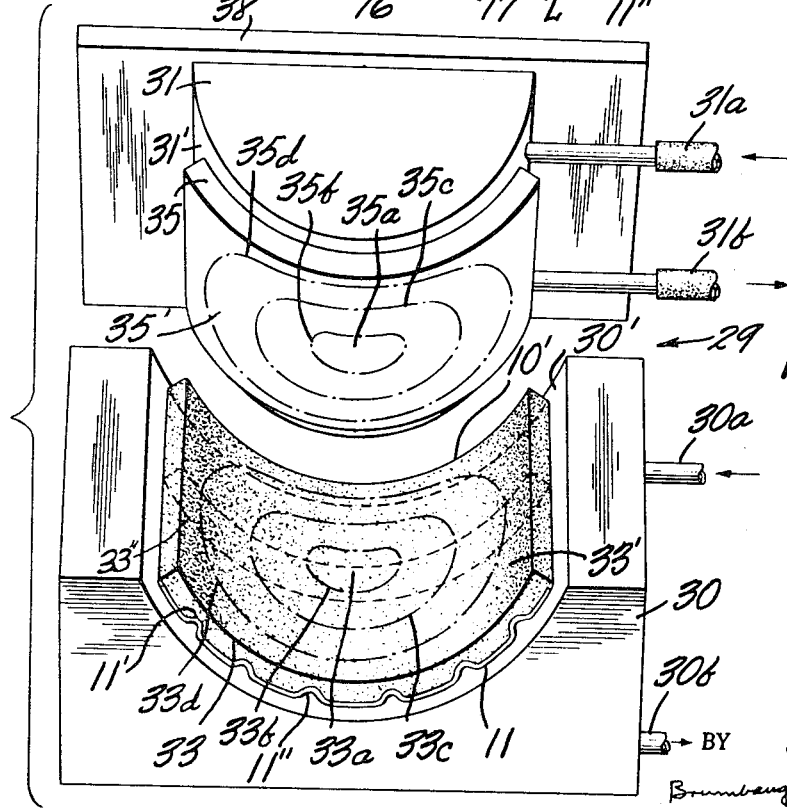
INVENTORS
ROBERT L. SORENSEN,
EARL E. BRODHAG &
JOHN V. CASANOVA
BY Brumbaugh, Free, Graves & Donohue
their ATTORNEYS

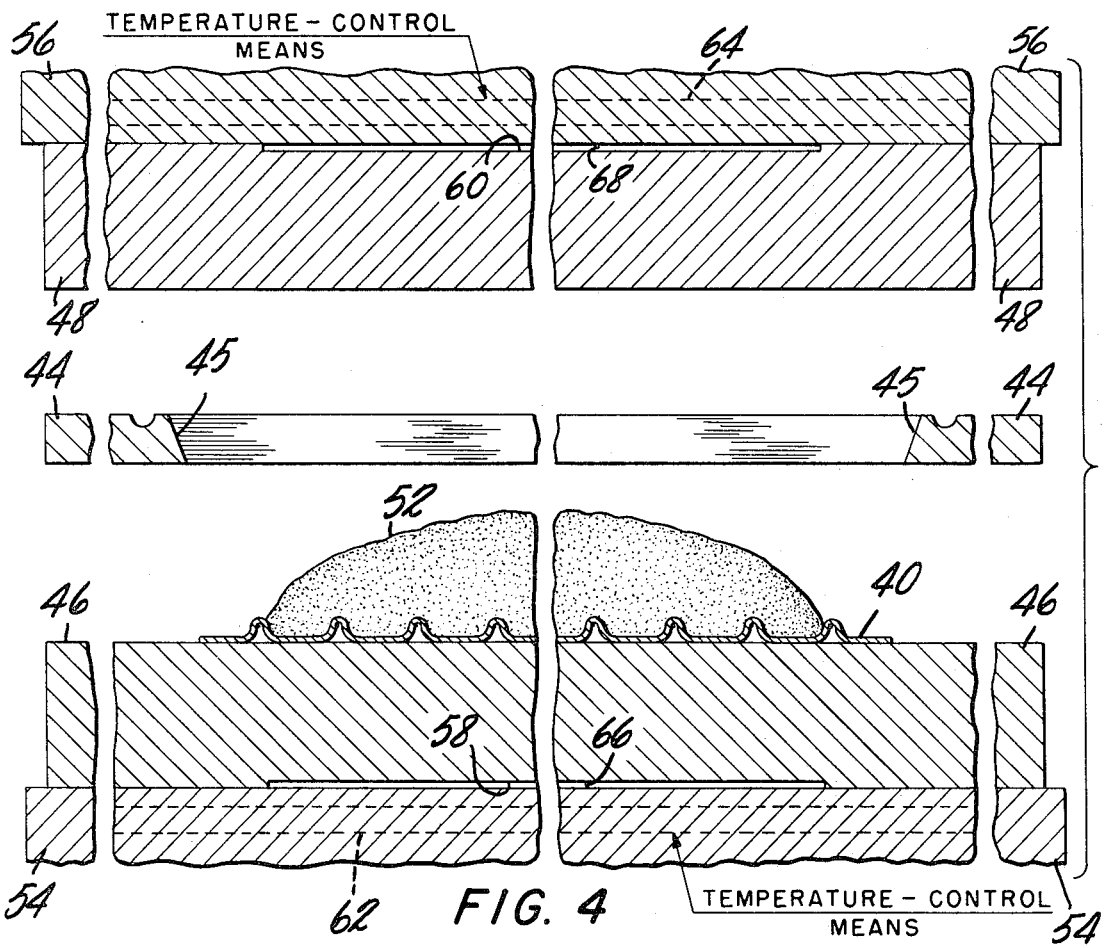
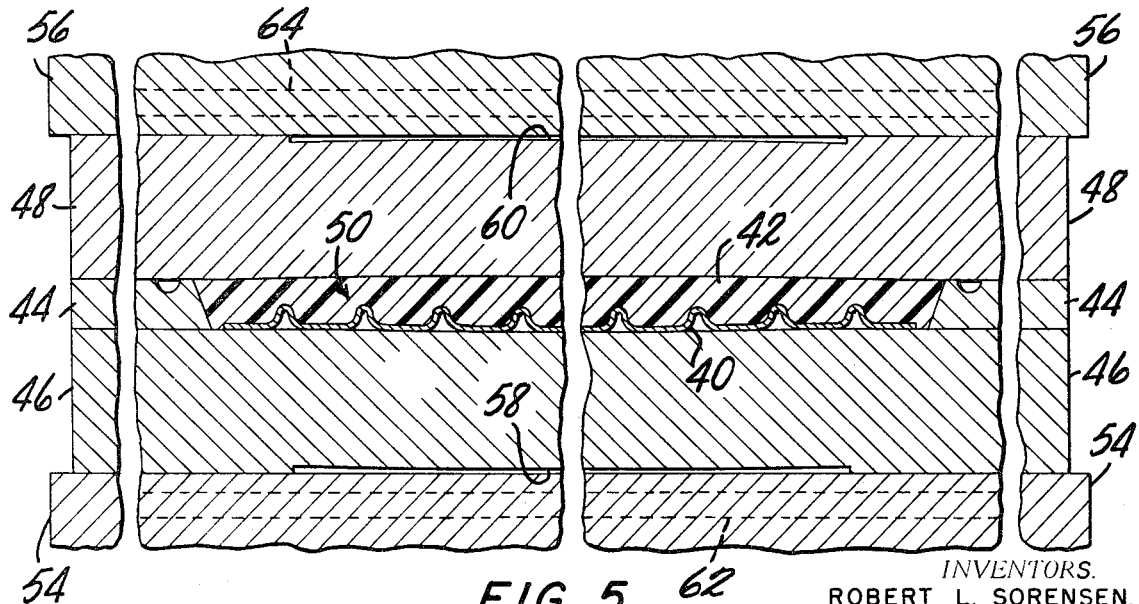

United States Patent Office 3,546,741
Patented Dec. 15, 1970

3,546,741
MOLDING AND LAMINATING
MOLDING APPARATUS
Robert L. Sorensen and Earle E. Brodhag, Westport,
Conn., and John V. Casanova, Racine, Wis., assignors
to Time, Incorporated, New York, N.Y., a corporation
of New York
Continuation-in-part of application Ser. No. 339,257,
Jan. 21, 1964. This application May 23, 1968, Ser.
No. 731,567
Int. Cl. B30b 5/02
U.S. Cl. 18—5                                    8 Claims

ABSTRACT OF THE DISCLOSURE

An electrotype printing plate is bonded to a plastic backing by apparatus including framing means and first and second plate means co-operating with the framing means to define an enclosure. At least one of the plate means is flexible without being locally deformable. An electrotype printing plate is placed in the enclosure together with a quantity of plastic to be bonded thereto. The quantity of plastic is such that the enclosure is charged to about 103% of its normal capacity, and the flexure of the flexible plate means permits closure of the plate means notwithstanding the overcharging of the enclosure. An insulating air space is preferably provided about the centers of the plate means so that after the plastic is bonded to the electrotype printing plate, thermal shock to the plastic is avoided during the cooling cycle and the plastic cools more rapidly at the edges than at the center. During the cooling of the plastic, the tendency of the flexed plate means to straighten out, augmented if necessary by a fluid pressure system, maintains the plastic under sufficient pressure to prevent the generation of gas bubbles and shrinkage lines in the plastic.

CROSS-REFERENCE TO RELATED APPLICATION

This is a continuation-in-part of our copending application Ser. No. 339,257, filed Jan. 21, 1964, for "Molding and Laminating Apparatus and Methods, and Products Thereof," now abandoned.

BACKGROUND OF THE INVENTION

This invention relates to apparatus for bonding an electrotype printing plate to a plastic backing and, more particularly, to novel and highly-effective apparatus facilitating the production of plastic backings free of gas bubbles and shrinkage lines.

There have recently been developed electrotype printing plates in which the backing is of plastic rather than lead. To be used safely on modern high-speed presses, all electrotypes, whether lead- or plastic-backed, must be bonded to sheets of stronger material such as aluminum or magnesium. Plastic backings and the lamination of backings, whether plastic or lead, to sheets of stronger material provide numerous advantages which are well known to workmen skilled in the art and which need not be detailed here. There are, however, certain attendant disadvantages.

Conventional apparatus for making electrotypes having plastic backings includes molds, generally metallic because of their permanence, into which a suitable plastic material to be molded is placed. The plastic material to be molded is heated within the mold so that it acquires the shape of the mold then cooled so that it is set in the shape of the mold. Inasmuch as plastics, particularly the tough, strong thermoplastic polymers such as the synthetic linear polyamides which are desirable for electrotype backings and which obtain much of their strength through a degree of crystallinity and hydrogen bonding, generally have a higher coefficient of expansion and contraction than metals, the plastic shrinks more during the cooling cycle than does the mold, producing a condition in which the mold cavity is not filled under pressure. As a result, any air which may be present in the plastic then expands, gas bubbles due to vaporization of volatile components such as water in the plastic form in local "hot spots," where the plastic is still fluid, and random shrinkage lines develop.

The molded product of conventional apparatus and methods is thus not entirely satisfactory; even if relatively free of bubbles, it must be further treated, for example by grinding its back to remove the shrinkage lines. To eliminate gas bubbles, workmen in the art employ other conventional techniques, such as the provision in the plastic of coarse woven cloths or matted sheets of fibrous material intended to define venting channels for gas pockets and "bumping" or "degassing" of the mold by an opening and shutting of the press while the plastic is molten to allow the entrapped gas to escape. These techniques involve additional steps and expense and sometimes a high degree of judgments by the operator and may degrade the plastic and fail to eliminate the bubbles.

SUMMARY OF THE INVENTION

An object of the present invention is to remedy the problems outlined above. In particular, an object of the invention is to provide apparatus for bonding an electrotype printing plate to a plastic backing without at any time causing thermal shock to the plastic and for producing a plastic backing free of gas bubbles and shrinkage lines.

The foregoing and other objects are attained in accordance with the invention by the provision of framing means and first and second plate means co-operating with the framing means to define an enclosure for receiving an electrotype printing plate and a quantity of plastic to be bonded thereto, at least one of the plate means being flexible without being locally deformable. Motive means is provided for closing the plate means not withstanding overcharging of the enclosure with the plastic, the center of the flexible plate means and the motive means being spaced apart from each other to permit limited flexure of the flexible plate means in response to closure of the plate means. Temperature-control means is also provided for first heating the plastic to facilitate bonding thereof to the electrotype printing plate then cooling thereof to use temperature, the flexibility of the flexible plate means permitting the application of sufficient pressure to the plastic to prevent the formation of gas bubbles and shrinkage lines therein during said cooling.

BRIEF DESCRIPTION OF THE DRAWINGS

For an understanding of further aspects of the invention, reference is made to the following detailed description of two exemplary embodiments thereof and to the accompanying figures of the drawings, in which:

FIG. 1 is a sectional schematic elevation of a first representative embodiment of molding apparatus constructed in accordance with the invention and in the open position;

FIG. 2 is a sectional schematic elevation of the apparatus of FIG. 1 in the closed position;

FIG. 3 is a perspective of laminating apparatus which forms no part of the invention claimed herein but which illustrates how the product made by the apparatus of the present invention can best be utilized;

FIG. 4 is a sectional schematic elevation of a second representative embodiment of molding apparatus constructed in accordance with the invention and in the open position; and FIG. 5 is a sectional schematic elevation of the apparatus of FIG. 4 in the closed position.

DESCRIPTION OF THE PREFERRED EMBODIMENTS

FIG. 1 shows apparatus 9 for molding a material such as a polyamide molding powder into a product such as a backing for an electrotype printing plate. Preformed synthetic linear polyamides, commonly known as nylons, a well-recognized class of substances, may suitably be the material used. Nylons are characterized by extreme hardness and excellent wearing qualities.

In accordance with the invention, a metered amount of polyamide molding powder 10 is deposited on the back side 11' of an electrotype shell 11 surrounded by framing means 12. The electrotype shell 11 is conventional, being, for example, an electroformed sheet of copper and nickel and having its front side 11" formed with a relief surface and its back side 11' clean and dry. The framing means 12 rests on a flexible plate means 13 which in turn rests on a peripheral portion 14 of a mold base 15 having a center portion 16. The peripheral portion 14 is raised with respect to the center portion 16, so that the flexible plate 13 is supported peripherally but not elsewhere.

The flexible plate 13 and the mold base 15 form an airtight compartment 17 therebetween provided, however, with an aperture 22 through which compressed air or another fluid under pressure may be introduced into the compartment 17 to increase the tendency of the flexible plate 13 to straighten out when flexed. Plate means 20 is engageable with the framing means 12 so that the flexible plate 13, framing means 12, and plate 20 define, in the closed position (FIG. 2), an enclosure 21 within which the polyamide molding powder 10 is contained.

The amount of polyamide molding powder deposited on the back face 11' of the electrotype shell 11 is metered so that, when the plate 20 is closed on the framing means 12, the polyamide molding powder 10 completely fills the mold cavity, there being little or no air entrapped therein, and, in fact, adjusts or stretches the flexible plate 13 downwardly (FIG. 2). A press temperature of 350° F. is maintained while the plate 20 is slowly closed under a low total force (about 15 to 200 pounds). As the molding powder is pressed between the heated electrotype shell 11 and plate 20, it gradually melts and assumes the shape of the enclosure 21. The amount of downward flexing of the flexible plate 13 as the mold closes is dependent on the thickness of the plate 13, the material of which it is made, and the amount of molding powder 10 deposited on the electrotype shell 11.

When the mold is closed, the pressure of the plate 20 and mold base 15 inwardly on the framing means 12 and periphery of the flexible plate 31 is raised to at least 200 pounds per square inch, and air or another fluid under a pressure of 50 to 150 pounds per square inch is introduced into the airtight compartment 17 through the aperture 22, which is connected to conventional means (not shown) such as a tank of compressed air or an air compressor. This subjects the plastic 10' to the combined pressure due to the flexed condition of the flexible and resilient plate 13 and the compression of the air or other fluid within the airtight compartment 17. This pressure prevents the vaporization of volatile materials which may be in the plastic and the expansion of any air which may be in the plastic and hence substantially prevents the formation of gas bubbles in the plastic. Moreover, it forces the plastic into the minute crevasses on the back side 11' of the shell 11.

The heat source is then removed from the press and the cooling cycle begun. The air pressure in the airtight compartment 17 may be continuously maintained or momentarily reduced and the closed mold assembly transferred to a second press with cold mold platens. In either case, means such as temperature-control means 23, 24 are provided for bringing the molded plastic from a molding temperature or first condition to a use temperature or second condition: i.e., a temperature or other condition in which the molded plastic can be put to its intended use, for example, in the printing art.

In accordance with the invention, the molded plastic is substantially free of gas bubbles and random shrinkage lines and hence needed be submitted to no further processing. The manufacture of electrotype printing plates is thus simplified and rendered more rapid and economical, involving virtually no waste of material. No adhesives are required either in sheet or liquid form, and a saving in purchase, handling, and application costs results. Moreover, powders containing as much as 2.5% of water are successfully molded in accordance with the present invention, whereas with prior art apparatus it has not proved possible to achieve success with powders containing more than 0.2% of water.

Further, the molding apparatus of the invention permits precise caliper control of the molded plastic product, such control being of particular importance in connection with the laminating of the molded plastic product to a backup or base plate of a strong, light material such as aluminum or magnesium. In particular, the overcharging of the enclosure 21 is sufficient to ensure that the thickness of the molded plastic backing is a maximum at a given location, such as L, and decreases continuously in all directions with increasing distance from such location.

FIG. 3 is a perspective of laminating apparatus 29 which forms no part of the present invention but which illustrates how the produce made by the apparatus of the present invention can best be utilized. The laminating apparatus 29 comprises a pair of precision dies 30, 31. For the sake of clearly showing points 33a and 35a and lines 33b–33b and 35b–35b referred to hereinafter in connection with a description of the operation of the laminating apparatus 29, the die 30 is shown with its near end pivoted downwardly with respect to the die 31 (or the die 31 with its near end pivoted upwardly with respect to the die 30). The dies 30, 31 may be similar to those disclosed in a patent to Fabler No. 3,045,585 in providing, for example, an inlet pipe 30a, an outlet pipe 30b, and connecting piping (not shown) for the circulation of a relatively cool fluid through the die 30 for the purpose of maintaining the molded plastic 10' in the vicinity of the electrotype shell 11 in the solid state and an inlet pipe 31a, and the outlet pipe 31b, and connecting piping (not shown) for the circulation of a relatively warm fluid through the die 31 for the purpose of simultaneously bringing successive portions of the molded plastic 10' remote from the shell 11 to the liquid or semiliquid state. The bond between the electrotype shell 11 and the molded plastic 10' can thus be preserved while a lamination of the plastic 10' with a base plate 35 of aluminum or a similar material is formed. The die 31 is then cooled by the circulation of a relatively cool fluid through the inlet pipe 31a, the outlet pipe 31b, and the connecting piping (not shown), whereupon the laminated product can be mounted on a printing press in the usual manner.

The apparatus of FIG. 3 thus provides means for uniting a first surface 33' of the molded plastic 10' to a second surface 35' of the aluminum or magnesium base plate 35 over a designated area. The surface 35' is convexly-cylindrically curved and has a melting temperature higher that that of the surface 33'. Means such as the lower concave die 30 or the molding apparatus disclosed in connection with FIGS. 1 and 2 are provided for curving the surface 33' complementally with respect to the curvature of the surface 35' but to a degree slightly less than the degree of curvature of the surface 35'. From another standpoint, the surface 33' is concavely curved in planes normal to the axis of curvature of the surface 35' to a degree slightly less than the degree of curvature of the surface 35' and is convexly curved in planes of the axis of curvature of the surface 35'. Thus, a section on the broken line 33" is thicker at its center than at its ends.

The die 31 serves as means for heating the surface 35′ to a temperature above the melting temperature of the surface 33′, and the die 31 and an upper platen 38 (or the die 30) serve as means for bringing the surfaces 33′ and 35′ together. Owing to the relative curvatures of the surfaces, successive portions of the surface 33′ are brought into contact with successive portions of the surface 35′ to form a lamination extending progressively to the limits of the area of the two surfaces in contact with each other without surrounding any portion of the first surface which is out of contact with the surface 35′. Thus, the points 33a and 35a first establish contact with each other to form an inchoate lamination; later, the lines 33b and 35b, located outwardly from the points 33a and 35a, respectively, establish contact with each other; later, the lines 33c and 35c, located outwardly from the lines 33b and 35b, respectively, establish contact with each other; still later, the lines 33d and 35d, located outwardly from the lines 33c and 35c, respectively, establish contact with each other; and so forth to the limit of the area of the surface 33′ or other designated area over which a lamination is to be formed.

Where the plastic employed in a nylon sold by E. I. du Pont de Nemours & Co. under the trademark Zytel 61 or Zytel 63, the die 30 in the vicinity of the shell 11 is not allowed to become hotter than 100° F., and the laminating pressure is not allowed to exceed 66 pounds per square inch.

It has been found that good adhesion between nylon and the aluminum mounting plate can be obtained without the use of an adhesive by preconditioning the aluminum surface. A medium-strength bond is achieved by first cleaning and etching the aluminum in a 160° F., 3%-by-weight bath of sodium hydroxide for a period of three minutes. A superior bond whose strength exceeds that of the nylon is obtained by a cleaning of the aluminum in a 3%-by-weight solution of trisodium phosphate for a period of one minute at a temperature of 180° F. followed by a five-minute anodizing treatment in a 50%-by-weight phosphoric acid bath using a positive DC potential of 15 volts on the aluminum and keeping the acid bath between 65° F. and 80° F.

By slightly overcharging the molding apparatus of FIGS. 1 and 2, the molded product produced by the apparatus of FIGS. 1 and 2 is made slightly thicker at a location such as L, which may be the center thereof, than at other portions thereof. Moreover, the thickness decreases continuously in all directions with increasing distance from L. Therefore, the proper relationship between the curvature of the surface 33′ and that of the surface 35′ can be established even though the dies 30 and 31 are conventional. That is, even though the surface 30′ has a degree of concavity matched in a conventional way to the degree of convexity of the surface 31′, the surface 33′ is given, when the molded product 10′ is hand-fitted together with an electrotype shell 11 onto the surface 30′, a degree of curvature complemental to but less than a degree of curvature of the surface 35′ by the requisite amount.

FIGS. 4 and 5 show another exemplary embodiment of apparatus according to the invention. The apparatus of FIGS. 4 and 5 bonds an electrotype shell 40 to a plastic backing 42. To this end, framing means 44 having an interior beveled edge 45 sloping inwardly and downwardly cooperates with first plate means 46 and second plate means 48 to define an enclosure 50 for receiving the electrotype shell 40 and a measured quantity of plastic 52.

Like the plate means 13, the plate means 46 and 48, or at least one of them, are flexible without being locally deformable. The absence of local deformability is important, for it ensures that the plate means 46 and 48 define smooth curves when flexing and that the pressure exerted thereby on the plastic 52 has everywhere the desired value. Particularly, it ensures that local high spots that tend to form in the plastic are smoothed down and shrinkage lines filled up, even though the plastic 52 may initially have been deposited nonuniformly in the enclosure 50.

Motive means such as platens 54 and 56, at least one of which is movable, is provided for closing the plate means 46 and 48 notwithstanding overcharging of the enclosure 50 with the plastic 52. Preferably, the enclosure 50 is overcharged with plastic 52 so that the enclosure 50 is filled to 103% of its normal capacity. The closing of the plate means 46 and 48 results in flexure of the one that is flexible or of both, if both are flexible. The tendency of the flexible plate means to straighten out generates pressure on the plastic 52 during the cooling cycle, and this prevents the formation of gas bubbles and shrinkage lines therein.

To facilitate flexure of the plate means 46 and 48, the centers 58 and 60 thereof, respectively, are spaced apart from the motive means comprising the platens 54 and 56. The flexure of the plate means 46 and 48 thus permitted is illustrated in FIG. 5, which shows the centers 58 and 60 of the flexible plate means 46 and 48 as being closer to the motive means comprising the platens 54 and 56 than such centers are in FIG. 4, which shows the apparatus in the open condition.

Temperature-control means 62 and 64 is provided for first heating the plastic 62 to facilitate bonding thereof to the electrotype shell 40 then cooling thereof to use temperature. The temperature-control means 62 and 64 may be electric heating elements or passages for water and steam, oil, or another heat-transfer fluid. For example, a fluid may be alternately hot and cold to facilitate first the heating step and then the cooling step. Alternatively, the plate means 46 and 48, the framing means 44, and the electrotype shell 40 and plastic 42 bonded thereto may be physically transferred from the platens 54 and 56, used for heating only, and placed between additional platens (not shown) used for cooling only.

In any case, the flexibility of the flexible plate means 46 and 48 permits the application of sufficient pressure to the plastic 52 during the cooling cycle to prevent the formation of gas bubbles and shrinkage lines therein.

The spacing apart of the centers 58 and 60 of the plate means 46 and 48 from the platens 54 and 56 defines air spaces 66 and 68 which serve as heat insulation means facilitating cooling of the plastic more rapidly at the periphery (where there is physical contact between the platens, plate means, and framing means) than at the center thereof during the cooling cycle. This has been experimentally verified by inserting special heat sensors in the mold at the center and ¾ of an inch from the end and measuring the temperatures at these locations at intervals of 10 seconds from 0 to 130 seconds during the cooling cycle. The following table shows the experimentally-obtained results:

| Total time of cooling, seconds: | Plastic temperature at mold center, ° F. | Plastic temperature ¾″ from mold end, ° F. |
| --- | --- | --- |
| 0 | 350 | 350 |
| 10 | 320 | 300 |
| 20 | 280 | 260 |
| 30 | 240 | 220 |
| 40 | 210 | 200 |
| 50 | 190 | 175 |
| 60 | 170 | 150 |
| 70 | 150 | 135 |
| 80 | 140 | 120 |
| 90 | 130 | 110 |
| 100 | 120 | 105 |
| 110 | 105 | 95 |
| 120 | 100 | 85 |
| 130 | 90 | 80 |

As the preceding table shows, there is obtained in accordance with the invention a more rapid cooling of the plastic at the periphery thereof than at the center. The particular plastic employed in obtaining the data set forth in the table is a nylon copolymer with a melting temperature of 265° F. and a secondary transition temperature of 180 degrees to 190° F., at which temperature the formation of spherolites results in an increase of density: i.e., plastic volume shrinkage. Similar results are obtained with many other plastics.

The formation of spherolites or globulites does not take place instantaneously. On the contrary, the plastic becomes gradually more crystalline as it cools from 180° F. to room temperature. During this time, continued shrinkage occurs. As the table shows, the plastic near the mold cavity edges solidifies some seconds before the plastic at the mold center. In accordance with the apparatus of the present invention, the contracting plastic is kept under pressure by the restoring action of the flexible plate means 46 and 48. Shrink marks are eliminated by supplying still-molten plastic to the freezing zone from the central portions of the cavity.

Density changes due to the formation of spherolites as large as 2% are observed. If the plastic is released from pressure during the change of phase, small random shrink lines or recesses develop in the plastic surface. These produce flaws in printing when the plastic sheet is employed as a printing element. By always maintaining pressure on the plastic with the flexible but not locally deformable plate or plates and by cooling from the mold edges, the initial stage of spherolite growth occurs at the mold edges. By the same token, the final stage of spherolite growth is limited to the central regions of the mold. The physical construction of the mold in accordance with the invention permits the greatest movement by the flexing plate means at the mold center in order to accommodate the greatest effect due to plastic shrinkage.

If the cooling cycle does not take place between the same platens employed for the heating cycle but takes place rather between two separate platens which are cold, it is desirable to provide recesses between the platens and each of the plate means 46 and 48. This prevents thermal distortion of the plate means during the cooling cycle. If, on the other hand, the cooling cycle takes place between the same two platens 54 and 56 employed during the heating cycle, a single recess, adjacent to the flexible plate means, is sufficient.

The flexible plate means, which must not be locally deformable, is made of a strong material such as metal. Typically, the area framed by the framing means 44 measures 9¼ inches by 12 inches, and the outside dimensions of the framing means 44 are 12 by 15 inches. The plate means 46 and 48 have recesses 66 and 68 (which may as well be formed in the platens 54 and 56) measuring 8 9/16 inches by 11 9/16 inches, and the outside dimensions of the plate means 46 and 48 are 12 by 15 inches. If made of steel, the flexible plate means are about ⅛ of an inch thick. If made of aluminum, they are about ¼ of an inch thick. The depth of the recesses 66 and 68 is about .003 of an inch to .004 of an inch, if two are employed, one between each of the flexible plate means 46 and 48 and the associated platen 54 and 56. If only one recess is employed, its depth is about twice the depth of each recess in the case where two are employed. The framing means 46 may be made of steel, coated all over with polytetrafluoroethylene.

As in the embodiment of FIGS. 1 and 2, means may be provided for introducing a fluid under pressure to the sides of the flexible plate means 46 and 48 not in contact with the plastic during the cooling cycle in order further to facilitate application of pressure to the plastic during the cooling cycle. However, because of the thickness of the flexible plate means 46 and 48 specified above, the apparatus functions satisfactorily even in the absence of the use of a pressurized fluid.

As noted above, the mold should be overcharged by about 3% to obtain a plaque with the desired thick center. Thus, about for a typical framing means measuring 9.25 inches by 12 inches by 0.083 inch and a molding powder containing 1.5% volatiles, the powder calculated for a flat plaque is 166 grams. In accordance with the present invention, however, molded plaques having the desired increasing thickness from edge to the center are obtained. The powder required for the desired plaques is 170 grams. In this way, a bubble-free and shrinkage-line-free plaque is always obtained.

Materials other than aluminum and steel can be employed provided they are flexible without being locally deformable. This requires, of course, that they be of the requisite thickness. Provided they are properly designed, materials including copper, cast iron and even hard rubber can be employed.

There is thus provided in accordance with the invention novel and highly-effective apparatus directed to the bonding of an electrotype shell to a plastic backing.

Many modifications in form and detail of the representative embodiments of the invention disclosed herein will occur to those skilled in the art.

For example, materials other than polyamide powder may be employed as the molding material, examples being polyethylene, the syntactic polymers made from ethylene and propylene, polyvinyl chloride, and copolymers of vinyl and vinylidene chlorides.

Also, whether one or two recesses 66 and 68 are employed and whether a pressurized fluid is employed may depend on the type of plastic. In the case of highly crystalline polymers where shrinkage values as high as 4% are encountered during solidification, two recesses 66 and 68 are generally used. One recess is generally sufficient, however, where shrinkage during solidification is 2% or less and the volatile content is 1% by weight or less.

Further, the electrotype shell may be omitted from the enclosure and only a measured quantity of plastic placed therein for molding, inasmuch as such plastic, molded to conform to the shape of the enclosure, has utility in the printing art apart from its combinatiton with an electrotype shell, particularly where the platsic is light-sensitive.

Moreover, the framing means may be formed integrally with one of the plate means.

Accordingly, the invention is not limited to the specific embodiments thereof disclosed in the specification and drawings but includes all of the embodiments thereof which fall within the scope of the appended claims.

We claim:

1. Apparatus for molding a plastic sheet, comprising framing means and first and second plate means cooperating with said framing means to define an enclosure for receiving a quantity of plastic, at least one of said plate means being flexible without being locally deformable, motive means for closing said plate means notwithstanding over charging of said enclosure with said plastic, the center of said flexible plate means and said motive means being spaced apart from each other to permit limit flexure of said flexible plate means in response to closure of said plate means, and temperature-control means for first heating said plastic to facilitate molding thereof to conform to the shape of said enclosure then cooling thereof to use temperature, the flexibility of said flexible plate means permitting the application of sufficient pressure to said plastic to prevent the formation of gas bubbles and shrinkage lines therein during said cooling.

2. Apparatus according to claim 1 wherein the center of each of said plate means and said motive means are spaced apart from each other to provide heat insulation facilitating cooling of said plastic more rapidly at the periphery than at the center thereof.

3. Apparatus according to claim 1 wherein said flexible plate means is made of metal.

4. Apparatus according to claim 3 wherein said metal is steel approximately ⅛ of an inch thick.

5. Apparatus according to claim 3 wherein said metal is aluminum approximately ¼ of an inch thick.

6. Apparatus according to claim 1 further comprising means for introducing a fluid under pressure to the side of said flexible plate means not in contact with said plastic during said cooling, in order further to facilitate application of pressure to said plastic during said cooling.

7. Apparatus according to claim 1 in which the flexibility of said flexible plate means permits closure of said plate means notwithstanding charging of said enclosure to 103% of its normal capacity.

8. Apparatus according to claim 1 wherein an electrotype shell is placed in said enclosure with said plastic and becomes bonded to said plastic during said heating.

References Cited

UNITED STATES PATENTS

| | | |
|---|---|---|
| 1,146,413 | 7/1915 | Edison. |
| 2,441,097 | 5/1948 | Hicks. |
| 2,519,661 | 8/1950 | Johnson. |
| 3,066,376 | 12/1962 | Pennell. |
| 3,114,934 | 12/1963 | Gerletz. |
| 3,130,451 | 4/1964 | Morse. |
| 3,131,426 | 9/1964 | Legler. |

J. HOWARD FLINT, JR., Primary Examiner